United States Patent [19]

Lanzer et al.

[11] Patent Number: 4,850,246

[45] Date of Patent: Jul. 25, 1989

[54] INTERAXLE DIFFERENTIAL FOR MOTOR VEHICLES

[75] Inventors: Heribert Lanzer, Gössendorf; Eberhard Wilks, Heiligenkreuz, both of Austria

[73] Assignee: Steyr-Daimler-Puch Aktiengesellschaft, Vienna, Austria

[21] Appl. No.: 68,961

[22] Filed: Jul. 1, 1987

[30] Foreign Application Priority Data

Jul. 3, 1986 [AT] Austria ................... 1798/86

[51] Int. Cl.⁴ ...................... F16H 47/00; F16D 57/00; F16D 31/00
[52] U.S. Cl. ...................... 74/655; 188/290; 192/58 R; 192/58 B
[58] Field of Search ............... 74/655, 681, 687, 705, 74/710, 711, 714; 180/248; 188/75, 311, 310, 293, 294, 82.1, 82.2, 290; 192/58 R, 58 B

[56] References Cited

U.S. PATENT DOCUMENTS

| | | | |
|---|---|---|---|
| 3,478,515 | 11/1969 | Haide | 192/58 R |
| 4,048,872 | 9/1977 | Webb | 74/711 |
| 4,084,654 | 4/1978 | Dudek | 74/711 |
| 4,174,771 | 11/1979 | Hirt . | |
| 4,357,840 | 11/1982 | Winzeler | 74/710 |
| 4,503,952 | 3/1985 | Hesse | 192/58 B |
| 4,691,593 | 9/1987 | Mueller | 74/705 |
| 4,700,800 | 10/1987 | Friedrich et al. | 74/705 |
| 4,714,129 | 12/1987 | Mueller | 180/248 |
| 4,726,255 | 2/1988 | Humpfer et al. | 74/688 |

FOREIGN PATENT DOCUMENTS

| | | |
|---|---|---|
| 2636741 | 2/1978 | Fed. Rep. of Germany . |
| 3533142 | 4/1986 | Fed. Rep. of Germany ...... 180/248 |
| 1357106 | 2/1971 | United Kingdom ................. 74/711 |

Primary Examiner—Leslie A. Braun
Assistant Examiner—Harold F. Macris
Attorney, Agent, or Firm—Marmorek, Guttman & Rubenstein

[57] ABSTRACT

An interaxle differential for connection between two driven axles (14) of a motor vehicle comprises a liquid friction coupling (1) and a planetary gear train (15) comprising three torque-transmitting members (16, 18, 20). The liquid friction coupling (1) comprises a liquid-filled housing, a coupling shaft, which coaxially protrudes into said housing at least one set of radially inwardly extending, axially spaced apart outer blades, which are mounted on the housing, and radially outwardly extending, axially spaced apart inner blades, which are fixed to the shaft in said housing and axially staggered from the outer blades. Each of said outer blades is adjustable in a radial plane to vary the radial overlap between the outer and inner blades. A first of said torque-transmitting members of the planetary gear train is directly connected to an input member of the differential gear. A second (20) of said torque-transmitting members is connected to said coupling shaft (3). Only a third (18) of said torque-transmitting members is connected in said differential to an output member (19) of the differential. The housing (2) of the liquid friction coupling (1) is held against rotation.

15 Claims, 3 Drawing Sheets

INTERAXLE DIFFERENTIAL FOR MOTOR VEHICLES

BACKGROUND OF THE INVENTION

1. Field of the Invention

This invention relates to an interaxle differential comprising a liquid friction coupling and a planetary gear train comprising three torque-transmitting elements.

2. Description of the Prior Art

British Patent Specification No. 1,357,106 describes an interaxle differential which is of the kind described above. But in that differential the liquid friction coupling serves only to lock the interaxle differential under certain operating conditions.

Published German Application No. 26 36 741 describes a liquid friction coupling which has a liquid-containing housing and a coupling shaft which protrudes into said housing. Radially inwardly extending, axially spaced apart outer blades are mounted on the housing. Radially outwardly extending, axially spaced apart inner blades are mounted on the shaft and interdigitate with the adjustable blades. The outer blades are movable in a radial plane to vary the overlap between the outer and inner blades. In the known coupling the outer blades constitute a plurality of sets of axially spaced apart blades and the blades of each set are fixed to a mounting shaft, which is rotatably mounted in the housing and parallel to the coupling shaft. The torque which is being transmitted by said known liquid friction coupling will depend on the radial overlap between the outer and inner blades and said radial overlap will depend on the force exerted on the outer blades by springs which act on the mounting shaft in a sense to urge said outer blades radially inwardly and on the centrifugal force which acts on the outer blades during a rotation of the housing and tends to move the outer blades radially outwardly. A ring is provided for adjusting the bias of the springs and said ring cannot be used to move the outer blades radially outwardly and cannot be adjusted at all when the housing is rotating. Besides, during a rotation of the housing when the coupling is in operation the outer blades will be pivotally moved by centrifugal force, regardless of the sense of rotation.

SUMMARY OF THE INVENTION

It is a first object of the invention to provide an interaxle differential for motor vehicles which permits a convenient external control of the torque being transmitted between two driven axles of a motor vehicle.

It is a second object of the invention to provide a liquid friction coupling which comprises axially spaced apart inner blades, which are radially fixed, and axially spaced apart outer blades which radially overlap said inner blades and are axially staggered therefrom and are radially adjustable from the outside of the coupling during the operation of said coupling so as to change the radial overlap between said inner and outer blades.

It is a further object of the invention to provide a liquid friction coupling which accomplishes the second object mentioned above and which tends to assume a position corresponding to a medium radial overlap between said outer and inner blades and to decrease and increase said overlap by a self-control in dependence on the sense of rotation of said inner blades.

The first object mentioned above is accomplished in accordance with the invention in that the liquid friction coupling comprises a liquid-filled housing, a coupling shaft, which coaxially protrudes into said housing at least one set of radially inwardly extending, axially spaced apart outer blades, which are mounted on the housing, and radially outwardly extending, axially spaced apart inner blades, which are fixed to the shaft in said housing and axially staggered from the outer blades, wherein each of said outer blades is adjustable in a radial plane to vary the radial overlap between the outer and inner blades, a first of said torque-transmitting members of the planetary gear train is directly connected to an input member of the differential gear, a second of said torque-transmitting members is connected to said coupling shaft or to said housing, an output member of said differential is connected in said differential only to a third of said torque-transmitting members, and the housing of the liquid friction coupling is held against rotation.

In such an interaxle differential the advantages afforded by the liquid friction coupling of the type described are utilized in a particularly desirable manner because the housing of said coupling is held against rotation during the operation of the differential so that the outer blades can be adjusted from the outside by simple technical means.

By means of the interaxle differential in accordance with the invention the distribution of torque from an engine to the two driven axles of the vehicle and the transmission of torque between the driven axles can be varied in a wide range and the transmission of torque between the two axles can be substantially eliminated arbitrarily so that a blocking of the rear wheels can be prevented when a front wheel is blocked during a braking operation.

During a rotation of the radially fixed inner blades, they exert via the liquid on the adustable outer blades a torque tending to radially move the outer blades inwardly or outwardly. As a result, the outer blades will be pulled radially between the inner blades during a rotation of the coupling shaft in one sense and will be urged radially outwardly out of the spaces between the inner blades during a rotation of the coupling shaft in the other sense. If the outer blades are mounted to be yieldable against a spring bias in the direction in which they are radially adjustable, the interaxle differential will be self-controlling in dependence on the speed and the sense of rotation of the coupling shaft. The outer blades may be biased by spring means urging the outer blades to an intermediate position. When torque is transmitted from the engine to both axles during forward travel, that self-control of the interaxle differential can be utilized to increase the overlap between the outer and inner blades so as to increase the torque being transmitted by the differential as soon as the wheels of the axle that is directly driven by the engine exhibit an increased slip and that torque increase can be achieved without an increase of the speed difference between the two axles. On the other hand, when torque is being transmitted from the axles to the engine during forward travel, the outer blades will assume a balanced position, which differs from the normal position because the inner blades are now rotating in the opposite sense. In that case the torque being transmitted between the two axles will be almost entirely eliminated so that a subsequent braking will be promoted. When the rear axle of the motor vehicle is being driven via the interaxle differential in accordance with the invention and the front wheels are braked to rotate at a lower speed than the rear wheels, the inner blades will rotate in a sense which is opposite to their sense of rotation which results when torque is being transmitted to the axles during forward travel. Owing to the rotation in that opposite sense the overlap between the outer and inner blades will virtually be eliminated so that even a strong decrease of the speed of the front wheels will not affect the rear wheels. If the front axle is driven via the interaxle differential, the radial overlap between the inner and outer blades can be entirely eliminated by an arbitrary control of the outer blades. The radial overlap between the blades will be arbitrarily controlled in any case during rearward travel.

When a motor vehicle provided with such an interaxle differential is cornering, the resulting torque bias will be only very small because the self-control will tend to decrease the radial overlap between the blades.

When a motor vehicle provided with the present interaxle differential is operated in the driving mode described last, the resulting torque bias will be only very small because the self-control will tend to decrease the radial overlap between the blades. During an operation in the other driving mode, the outer blades can be arbitrarily controlled to inhibit the generation of a torque bias. The radial overlap between the blades will always be arbitrarily controlled during a reverse travel.

In a preferred embodiment of the invention, the outer blades of the liquid friction coupling constitute at least two sets of axially spaced apart outer blades, the outer blades of each of said sets are pivoted to said housing on a common pivotal axis, which is parallel to the coupling shaft, each of said outer blades has an arcuate series of teeth, which is centered on the associated pivotal axis, and the series of teeth of the outer blades of each of said mesh with a pinion shaft, which is parallel to the coupling shaft and is rotatable to pivotally move all said outer blades of said set in unison and to the same extent.

DETAILED DESCRIPTION OF THE PREFERRED EMBODIMENTS

Figure 1:
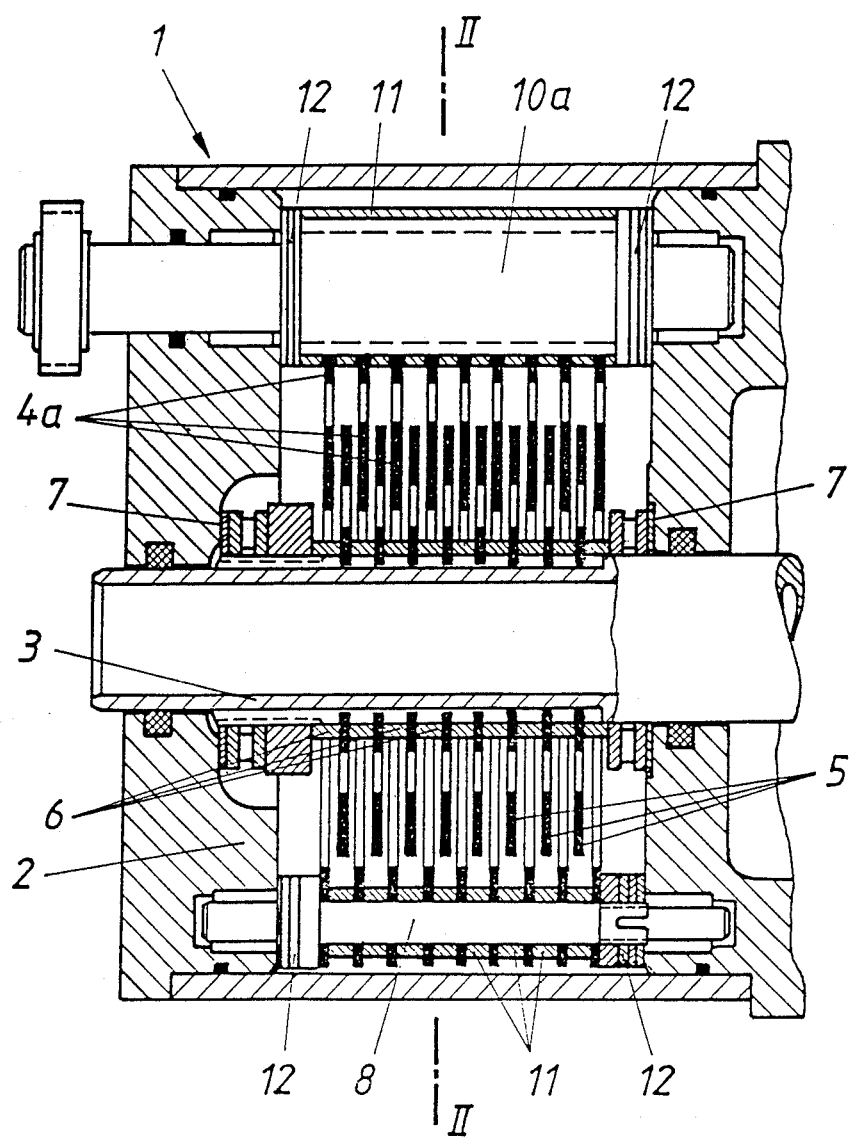
FIG. 1 is an axial sectional view taken on line I—I in FIG. 2 and showing a controllable liquid friction coupling for use in the interaxle differential in accordance with the invention.
Figure 2:
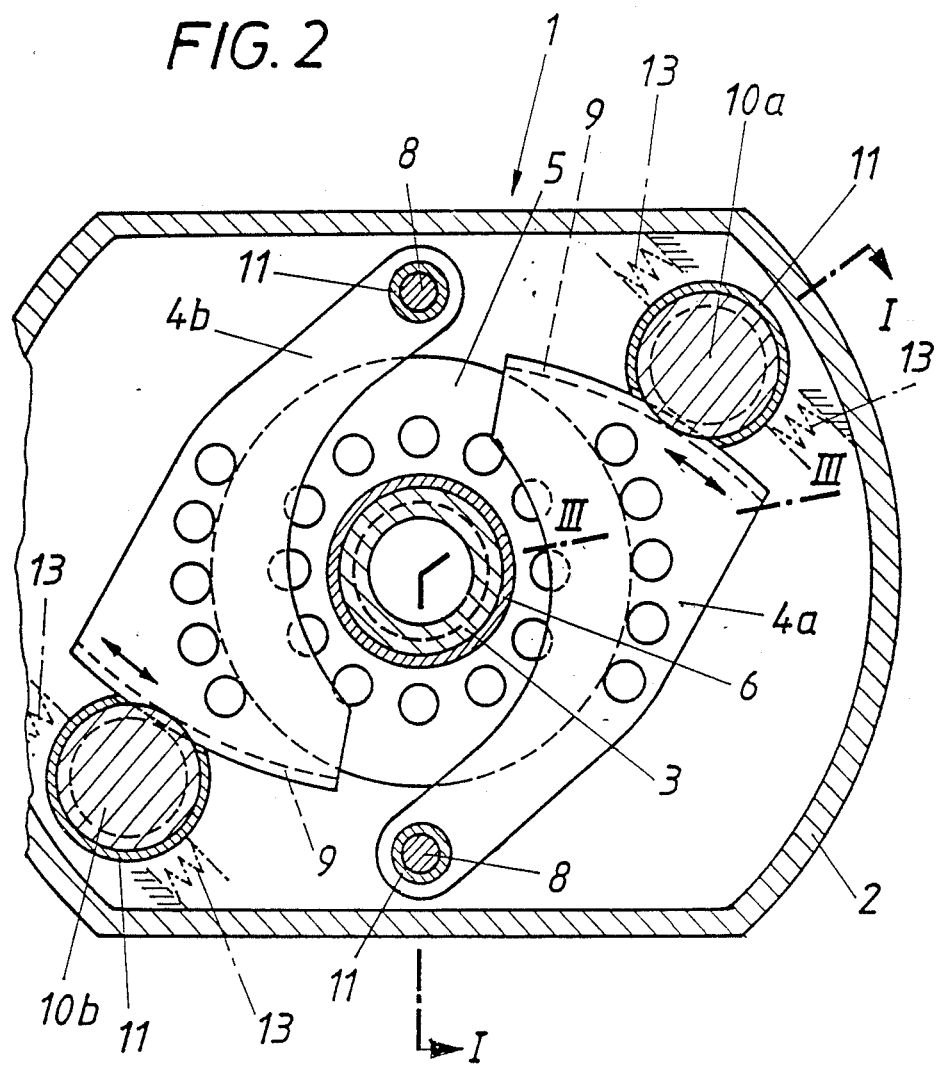
FIG. 2 is a transverse sectional view taken on line II—II in FIG. 1.

The liquid friction coupling generally designated 1 in FIGS. 1 and 2 comprises a housing 2, which is filled with a viscous liquid, and a tubular coupling shaft 3, which coaxially protrudes into the housing 2. Axially spaced apart, radially adjustable outer blades 4a, 4b are mounted on and extend radially inwardly in the housing 2. Axially spaced apart, radially fixed, inner blades 5 are secured to and extend radially outwardly from the coupling shaft 3 and are radially staggered from the outer blades 4a, 4b. The inner blades 5 are splined to the coupling shaft 3 and are located in exactly predetermined axial positions in the housing 2 by spacing sleeves 6 and spacing washers 7. The outer blades mounted in the housing 2 constitute two sets of outer blades 4a, 4b, as shown in FIG. 2. All outer blades 4a of one set are pivoted on a first pivot 8. All outer blades 4b of the other set are pivoted on a second pivot 8, which is diametrically opposite to the first pivot 8. Each of the first and second pivots 8 is parallel to the coupling shaft 3. Each of the outer blades 4a, 4b is formed with an arcuate series of teeth 9, which is centered on the associated pivot 8. Two pinion shafts 10a, 10b, are rotatably mounted in the housing 2 and extend parallel to the coupling shaft 3 and are respectively in mesh with the series of teeth 9 of all outer blades 4a and of all outer blades 4b. The blade elements 4a, 4b are also axially held at exactly predetermined locations by spacer sleeves 11 and spacer discs 12. Said locations are so selected that the inner blades 5 on the one hand, and the outer blades 4a, 4b, on the other hand, cannot contact each other. The pinion shafts 10, 10b can be arbitrarily rotated from the outside of the housing 2 to impart to all outer blades 4a, 4b a pivotal movement in one direction or the other at the same time so as to vary the radial overlap between said outer blades 4a, 4b on the one hand, and the inner blades 5, on the other hand, and thus to change the torque which is exerted by the coupling shaft 3 on the housing 2 via the liquid. The outer blades 4a, 4b can be pivotally moved outwardly to such an extent that they no longer overlap the inner blades 5 so that the torque being transmitted by the interaxle differential is decreased virtually to zero.

Figure 3:
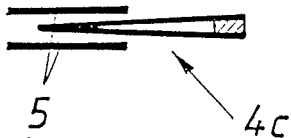
FIG. 3 is a transverse sectional view taken on line III—III in FIG. 2 and showing as a detail a modified outer blade.

The pivotal movement of the outer blades 4a, 4b may be utilized to change also the clearances between the side faces of said outer blades and the adjacent inner blades 5. This can be ensured in that each of the outer blade elements 4a and 4b is wedge-shaped in a section plane extending through the axis of the coupling shaft 3 and has a thin edge facing said coupling shaft, as is shown in FIG. 3 for an outer blade 4c.

When the coupling shaft 3 is being driven, the inner blades 5 exert via the viscous liquid in the housing 2 on the outer blades 4a, 4b a torque which in dependence on the sense of rotation of the coupling shaft 3 will move the outer blades 4a, 4b toward or away from the coupling shaft 3. That torque can be utilized for a self-control of the coupling if the outer blades 4a, 4b are mounted so that they can yield to that torque and are subjected to a spring bias radially urging the blade elements 4a and 4b to an intermediate position between innermost and outermost positions. This can be accomplished by the provision of a control mechanism such as is shown in FIG. 2, where each of the pinion shafts 10a, 10b carries axially spaced apart radial arms, which are rotatably biased by springs 13, which are supported on fixed abutments and tend to hold the associated pinion shaft 10a or 10b in a predetermined rotational position and to return the pinion shaft to that position after a rotation of the pinion shaft. Because the housing 2 is fixed, the self-control effected by the springs 13 will not be dependent on a centrifugal force exerted by the outer blades 4a, 4b.

Figure 4:
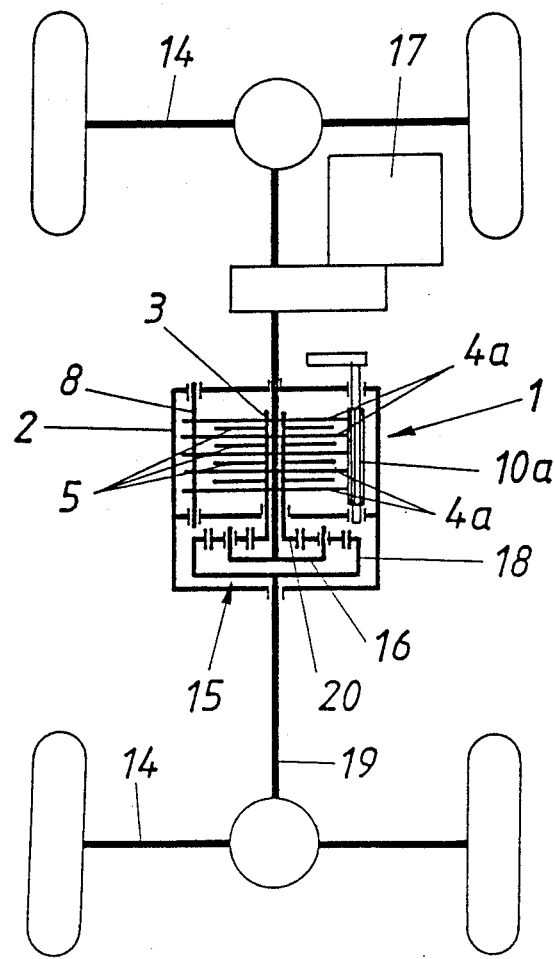
FIG. 4 is a diagrammatic representation of an embodiment of an interaxle differential in accordance with the invention incorporated in a motor vehicle.

The interaxle differential shown in FIG. 4 is connected between two driven axles 14 of a motor vehicle and comprises a planetary gear train 15 and the liquid friction coupling 1 described with reference to FIGS. 1 to 3. A first torque-transmitting member of the planetary gear train 15 consists of a planet carrier 16, which is connected via an input member of the differential to an engine 17. The second torque-transmitting member of the planetary gear train consists of an internal gear 18, which is connected to an output member 19. The third torque-transmitting member of the planetary gear train 15 consists of a sun gear 20, which is nonrotatably connected to the tubular coupling shaft 3 of the liquid friction coupling 1. The inner blades 5 are secured to the coupling shaft 3. The housing 2 of the liquid friction coupling 1 is provided with the outer blades 4a, 4b and is held against rotation. The characteristic of the liquid friction coupling 1 can be arbitrarily controlled in that the outer blades 4a, 4b are pivotally adjusted in unison by a rotation of the pinion shafts 10a, 10b. This can be accomplished without difficulty because the housing 2 is held against rotation.

It will be apparent from the foregoing that the pinion shafts 10a, 10b constitute control means, which are mechanically connected to the outer blades 4a, 4b and extend to the outside of the housing 2 and are operable from the outside of said housing to move the outer blades 4a, 4b radially inwardly to an inner position to increase the overlap between the inner blades 5 and the outer blades 4a, 4b and radially outwardly to an outer position to decrease said overlap substantially to zero. By means of the radial arms on the pinion shafts 10a, 10b, the springs 13 urge the outer blades 4a, 4b about the pivotal axes defined by the pivots 8, 8 to an intermediate position between the inner and outer positions.

The coupling in accordance with the invention is capable of a self-control owing to the provision of the springs 13, as has been explained hereinbefore. The coupling disclosed in Published German Application 26 36 741 is also capable of a self-control by the cooperation of the coupling shaft 1 and the springs 15, the external control by the ring 16 can be used only to change the characteristics of said self-control rather than to override the same, as is possible in the coupling in accordance with the present invention owing to the provision of control means which are mechanically connected to the outer blades and are operable from the outside of the housing to move the outer blades radially inwardly and outwardly.

We claim:

1. An interaxle differential for transmitting torque in a motor vehicle, comprising
    first and second driven axles,
    an input member for driving said first driven axle,
    an output member for driving said second driven axle,
    a planetary gear train and a liquid friction coupling positioned between said first and second driven axles for distributing torque between said first and second driven axles,
    said planetary gear train having first, second and third torque transmitting members,
    said first torque transmitting member being connected to and being driven by said input member,
    said third torque transmitting member being connected to and driving said output member,
    said liquid friction coupling comprising first and second coupling members, said first coupling member comprising a housing, and a set of axially spaced apart outer blades attached to and extending radially inwardly into said housing, said second coupling member comprising a coupling shaft which extends concentrically into said housing, and a set of axially spaced apart inner blades attached to and extending radially outwardly from said coupling shaft, said set of inner blades being axially staggered from and radially overlapping said set of outer blades, said second torque transmitting member being non-rotatably connected to said second coupling member,
    said set of outer blades being mounted to said housing for radial movement relative to said set of inner blades from an innermost position to increase and decrease a radial overlap of said set of outer blades with said set of inner blades,
    said housing being held against rotation, and
    control means mechanically connected to said set of outer blades and extending to the outside of said housing for adjusting a radial position of said set of outer blades relative to said set of inner blades,
    said outer blades of said set being pivotally mounted to said housing about a common pivotal axis that is parallel to said coupling shaft,
    each of said outer blades including an arcuate series of teeth centered on said pivotal axis,
    said control means comprising a rotatably mounted pinion shaft which is parallel to said coupling shaft, said pinion shaft meshing with the teeth of said outer blades and being rotatable from the outside of said housing.

2. The interaxle differential of claim 1, comprising
    a plurality of said sets of outer blades,
    the outer blades of each of said sets being pivotally mounted to said housing about a common pivotal axis parallel to said coupling shaft,
    said pivotal axis being peripherally spaced apart from said coupling shaft,
    said control means comprising a plurality of rotatably mounted pinion shafts which are parallel to said coupling shaft, each of said pinion shafts meshing with the teeth of all outer blades of said sets and being rotatable from the outside of said housing.

3. The interaxle differential of claim 1 comprising
    two sets of said sets of outer blades,
    said pivotal axes being diametrically opposite to each other.

4. The interaxle differential of claim 1 wherein
    said control means are arbitrarily operable and adapted to move said outer blades radially outwardly about said pivotal axis to an outermost position to decrease said overlap,
    said outer blades are arranged to assume an intermediate position between said innermost and said outermost positions,
    spring means are operatively connected to said pinion shaft and torsionally urge said pinion shaft to a rotational position corresponding to said intermediate position of said outer blades, and
    said control means are releasable to yield to the force of said spring means.

5. A liquid friction coupling, comprising
    first and second coupling members, said first coupling member comprising a housing, and a set of axially spaced apart outer blades attached to and extending radially inwardly into said housing, said second coupling member comprising a coupling shaft which extends concentrically into said housing, and a set of axially spaced apart inner blades attached to and extending radially outwardly from said coupling shaft,
    said set of inner blades being axially staggered from and radially overlapping said set of outer blades,
    said set of outer blades being mounted to said housing for radial movement relative to said set of inner blades from an innermost position to increase and decrease the radial overlap of said set of outer blades with said set of inner blades, said housing being held against rotation, and control means mechanically connected to said set of outer blades and extending to the outside of said housing for adjusting the radial position of said set of outer blades relative to said set of inner blades, said outer blades of said set being pivotally mounted to said housing about a common pivotal axis which is parallel to said coupling shaft, each of said outer blades including an arcuate series of teeth which is centered on said pivotal axis, and said control means comprising a rotatably mounted pinion shaft which is parallel to said coupling shaft, said pinion shaft meshing with said teeth of said outer blades and being rotatable from the outside of said housing.

6. An interaxle differential for transmitting torque in a motor vehicle, comprising first and second driven axles, an input member for driving said first driven axle, an output member for driving said second driven axle, a planetary gear train and a liquid friction coupling positioned between said first and second driven axles for distributing torque between said first and second driven axles, said planetary gear train having first, second and third torque transmitting members, said first torque transmitting member being connected to and being driven by said input member, said third torque transmitting member being connected to and driving said output member, said liquid friction coupling comprising first and second coupling members, said first coupling member comprising a housing and a set of axially spaced apart outer blades attached to and extending radially inwardly into said housing, said second coupling member comprising a coupling shaft which extends concentrically into said housing, and a set of axially spaced apart inner blades attached to and extending radially outwardly from said coupling shaft, said set of inner blades being axially staggered from and radially overlapping said set of outer blades, said second torque transmitting member being non-rotatably connected to said seccond coupling member, said set of outer blades being mounted to said housing for radial movement relative to said set of inner blades from an innermost position to increase and decrease a radial overlap of said set of outer blades with said set of inner blades, said housing being held against rotation, and control means for manually adjusting a radial position of said set of outer blades relative to said set of inner blades, said control means being mechanically connected to said set of outer blades and including manual actuation means extending to the outside of said housing.

7. The interaxle differential of claim 6 wherein said control means are manually actuable from outside said housing by said manual actuation means.

8. The interaxle differential of claim 7 wherein each of said outer blades is pivotally mounted to said housing about a pivotal axis that is parallel to said coupling shaft, said control means are operable to move said outer blades radially outwardly about said pivotal axis to an outermost position to decrease said overlap, spring means are provided for urging said outer blades about said pivotal axes to an intermediate position between said innermost and outermost positions, and said control means are releasable to yield to the force of said spring means.

9. The interaxle differential of claim 7 wherein said control means are operable to move said outer blades radially outwardly so as to substantially eliminate any radial overlap between said inner and outer blades.

10. A liquid friction coupling comprising first and second coupling members, said first coupling member comprising a housing, and a set of axially spaced apart outer blades attached to and extending radially inwardly into said housing, said second coupling member comprising a coupling shaft which extends concentrically into said housing, and a set of axially spaced apart inner blades attached to and extending radially outwardly from said coupling shaft, said set of inner blades being axially staggered from and radially overlapping said set of outer blades, said outer blades of said set being pivotally mounted to said housing about a common pivotal axis that is parallel to said coupling shaft for joint radial movement as a set relative to said set of inner blades from innermost positions to increase and decrease radial overlap of said outer blades with said inner blades, said housing being held against rotation, and control means for adjusting radial positions of said set of outer blades relative to said set of inner blades, said control means being mechanically connected to said set of outer blades and including manual actuation means extending to the outside of said housing.

11. The liquid friction coupling of claim 10 wherein said control means are manually actuable by said manual actuation means and adapted to move said set of outer blades radially outwardly about said pivotal axis to outermost positions to decrease said overlap, said outer blades are arranged to assume intermediate positions between said innermost and outermost positions, spring means are provided for urging said outer blades to said intermediate positions, and said control means are releasable to yield to the force of said spring means.

12. The liquid friction coupling of claim 10 wherein said control means are manually actuable from outside said housing by said manual actuation means.

13. The liquid friction coupling of claim 10 wherein said control means are operable to move said set of outer blades radially outwardly so as to substantially eliminate any radial overlap between said inner and outer blades.

14. The liquid friction coupling of claim 10 further comprising an interaxle differential including a planetary gear train connected to one of said coupling members.

15. The liquid friction coupling of claim 10 wherein said outer blades are wedge-shaped in cross-section.

* * * * *